United States Patent [19]
Andreadakis et al.

[11] Patent Number: 5,204,581
[45] Date of Patent: Apr. 20, 1993

[54] DEVICE INCLUDING A TAPERED MICROMINIATURE SILICON STRUCTURE

[75] Inventors: Nicholas C. Andreadakis, White House Station; Robert B. Marcus, Murray Hill; Tirunelveli S. Ravi, Eatontown, all of N.J.

[73] Assignee: Bell Communications Research, Inc., Livingston, N.J.

[21] Appl. No.: 892,289

[22] Filed: Jun. 2, 1992

Related U.S. Application Data

[60] Division of Ser. No. 774,361, Oct. 8, 1991, which is a continuation of Ser. No. 551,771, Jul. 12, 1990, abandoned.

[51] Int. Cl.$^5$ .......................... H01J 1/30; H01J 19/24
[52] U.S. Cl. .................................. 313/336; 313/309; 313/351
[58] Field of Search ...................... 313/336, 351, 309; 357/9, 10, 12, 13, 15, 16, 50

[56] References Cited

U.S. PATENT DOCUMENTS

| | | | |
|---|---|---|---|
| 2,817,002 | 12/1957 | Dyke et al. | 219/121 |
| 3,852,595 | 12/1974 | Aberth | 250/288 |
| 3,970,887 | 7/1976 | Smith et al. | 313/309 |
| 4,307,507 | 12/1981 | Gray et al. | 29/580 |
| 4,513,308 | 4/1985 | Greene et al. | 357/55 |
| 4,588,614 | 3/1986 | Gray et al. | 313/309 |
| 4,685,996 | 8/1987 | Busta et al. | 156/628 |
| 4,721,885 | 1/1988 | Brodie et al. | 313/576 |
| 4,766,340 | 8/1988 | van der Mast et al. | 313/366 |
| 4,940,916 | 7/1990 | Borel et al. | 313/306 |
| 4,968,382 | 11/1990 | Jacobson et al. | 156/643 |
| 5,100,355 | 3/1992 | Marcus et al. | 445/24 |

FOREIGN PATENT DOCUMENTS 0549039 9/1978 U.S.S.R. .............................. 313/336

OTHER PUBLICATIONS

R. B. Marcus et al, "A novel vacuum microelectronics electron field emitter," The First International Vacuum Microelectronics Conference Proceedings, Jun. 13–15, 1988, sponsored by The Electron Device Society of the IEEE.

C. E. Holland et al, "Spindt cold cathode vacuum fluorescent display," *Proceedings of the EuroDisplay 87*, pp. 1–3, Sep. 1987.

R. Greene et al, "Vacuum integrated circuits," Proceedings of the *International Electron Devices Meeting*, pp. 172–175, Dec. 1985.

C. A. Spindt et al, "Physical properties of thin-film field emission cathodes with molybdenum cones," Journal of Applied Physics, Jul. 1976 vol. 47, pp. 5248–5263.

J. B. Warren, "Control of silicon field emitter shape with isotropically etched oxide masks," *Proceedings of the Second International Conference on Vacuum Microelectronics*, Jul. 1989, pp. 37–40.

D. Stephani et al, "Fabrication of densely packed sharp silicon field emitters using dry etching techniques," *Proceedings of the Second International Conference on Vacuum Microelectronics*, Jul. 1989, p. 18.

D. J. Elliott, *"Integrated Circuit Fabrication Technology,"* Dec. 1989, Second Edition, McGraw-Hill Publishing Company, New York.

E. Yablonovitch et al, "Unusually Low Surface-Recombination Velocity on Silicon and Germanium Surfaces," *Physical Review Letters*, vol. 57, pp. 249–252. Jul. 1986.

*Primary Examiner*—Palmer C. DeMeo
*Assistant Examiner*—Ashok Patel
*Attorney, Agent, or Firm*—Leonard Charles Suchyta; James W. Falk

[57] ABSTRACT

Tapered silicon structures, of interest for use, e.g., in atomic force microscopes, in field-emission devices, and in solid-state devices are made using silicon processing technology. Resulting tapered structures have, at their tip, a radius of curvature of 10 nanometers or less.

12 Claims, 4 Drawing Sheets 5,204,581

DEVICE INCLUDING A TAPERED MICROMINIATURE SILICON STRUCTURE

This is a division of application Ser. No. 07/774,361, filed Oct. 8, 1991, which is a continuation of application 07/551,771, filed Jul. 12, 1990, now abandoned.

TECHNICAL FIELD

The invention is concerned with devices comprising a tapered microminiature structure and with the fabrication of such structures

BACKGROUND OF THE INVENTION

Microminiature pointed, conical or pyramid-shaped tapered structures have been suggested for use, e.g., in scanning tunneling microscopes, in atomic force microscopes, as biological probes, and in vacuum-microelectronic devices. Also, more specifically with respect to the latter, wedge- or ridge-shaped structures have been suggested, e.g., as disclosed by R. B. Marcus et al., "A Novel Vacuum Microelectronics Electron Field Emitter", The First International Vacuum Microelectronics Conference, June 13-15, 1988, sponsored by The Electron Device Society of the IEEE.

With regard to specific electronic devices, microminiature tapered structures are receiving attention for use as cathodes in specialized applications; for example, as described by C. E. Holland et al., "Spindt Cold Cathode Vacuum Fluorescent Display", EuroDisplay 87, pp. 1-3, resulting structures are suggested for use as cathodes in matrix cathodoluminescent displays. Further use is contemplated, e.g., in transducers, in slow-wave structures for coherent terahertz electromagnetic sources, as cathodes for free-electron lasers, and in integrated electron gun structures for traveling wave tubes; see R. Greene et al., "Vacuum Integrated Circuits", IEDM 85, pp. 172-175. Proposed further are three-terminal field-emission devices for very-high-speed microelectronic circuits; see, e.g., U.S. Pat. No. 4,721,885, issued Jan. 26, 1988 to I. Brodie.

Since, unlike solid-state devices, field-emission devices rely on electrons traveling in free space, miniaturization of such devices poses challenges not encountered at present in the fabrication of solid-state devices. One fabrication method, disclosed by C. A. Spindt et al., "Physical Properties of Thin-film Field Emission Cathodes with Molybdenum Cones", Journal of Applied Physics, Vol. 47 (1976), pp. 5248-5263, involves the formation of cone-shaped emitter structures by molybdenum metal deposition in the presence of a suitable mask. Proposed also is a method involving selective etching of (doped) silicon; see U.S. Pat. No. 3,970,887, issued Jul. 20, 1976 to D. O. Smith et al. And, for yet other methods, involving molding of metal or semiconductor material, see U.S. Pat. No. 4,307,507, issued December 29, 1981 to H. F. Gray et al., and U. S. Patent 4,685,996, issued Aug. 11, 1987 to H. H. Busta et al.

For the fabrication of miniaturized tapered structures, and especially of arrays of such structures for use as field-emission cathodes, silicon technology is considered particularly advantageous; see, e.g., J. B. Warren, "Control of Silicon Field Emitter Shape with Isotropically Etched Oxide Masks", Second International Conference on Vacuum Microelectronics, July 1989, pp. 37-40 and D. Stephani et al., "Fabrication of Densely Packed Sharp Silicon Field Emitters Using Dry Etching Techniques", Second International Conference on Vacuum Microelectronics, July 1989, p. 18.

In the context of silicon processing—and, e.g., in the interest of maximizing field-emission efficiency in field-emission devices, or in the interest of increased resolution in scanning microscopes—it is desired to enhance the sharpness of micro-miniature tapered structures or protuberances. Also, where an array of such structures is included as, e.g., in a display device, high uniformity of sharpened protuberances is desirable. Uniformity is similarly desirable in the fabrication, by wafer processing, of device chips comprising protuberances It is such twin aims of sharpness and uniformity which motivate the invention described below.

SUMMARY OF THE INVENTION

For incorporation, e.g., in electronic display and semiconductor devices, tapered silicon protuberances are sharpened to terminate in an apex having a preferred radius of curvature not exceeding approximately 10 nanometers, and radii of curvature not exceeding 1 nanometer can be achieved. Optionally, without appreciable effect on sharpness, another material, e.g., tungsten may replace silicon at the surface of a sharpened protuberance; also, thin films of other materials, e.g., gold may be deposited.

A preferred sharpening treatment comprises surface oxidation at relatively low temperature and applied to protuberances which are sufficiently slender and which have sufficient initial taper. Preferably, in the interest of apex uniformity in an array of protuberances, such oxidation treatment is repeated once or several times.

In cases where resulting uniform apices have radius of curvature less than a desired value, further oxidation processing at elevated temperature may be used to produce protuberances with desired increased radius.

For the sake of clarity and ease of appreciation, structural features are not drawn to scale in the Figures.

DETAILED DESCRIPTION

In the Figures, like features are designated by the same numeral; in the following, physical dimensions and measurements are understood to be nominal or approximate. Devices and structures in accordance with FIG. 2-5 are representative of vacuum-electronic and solid-state devices incorporating tapered silicon protuberances or structures in accordance with an aspect of the invention. FIG. 6-11 illustrate preferred processing in the fabrication of such structures.

Figure 1:
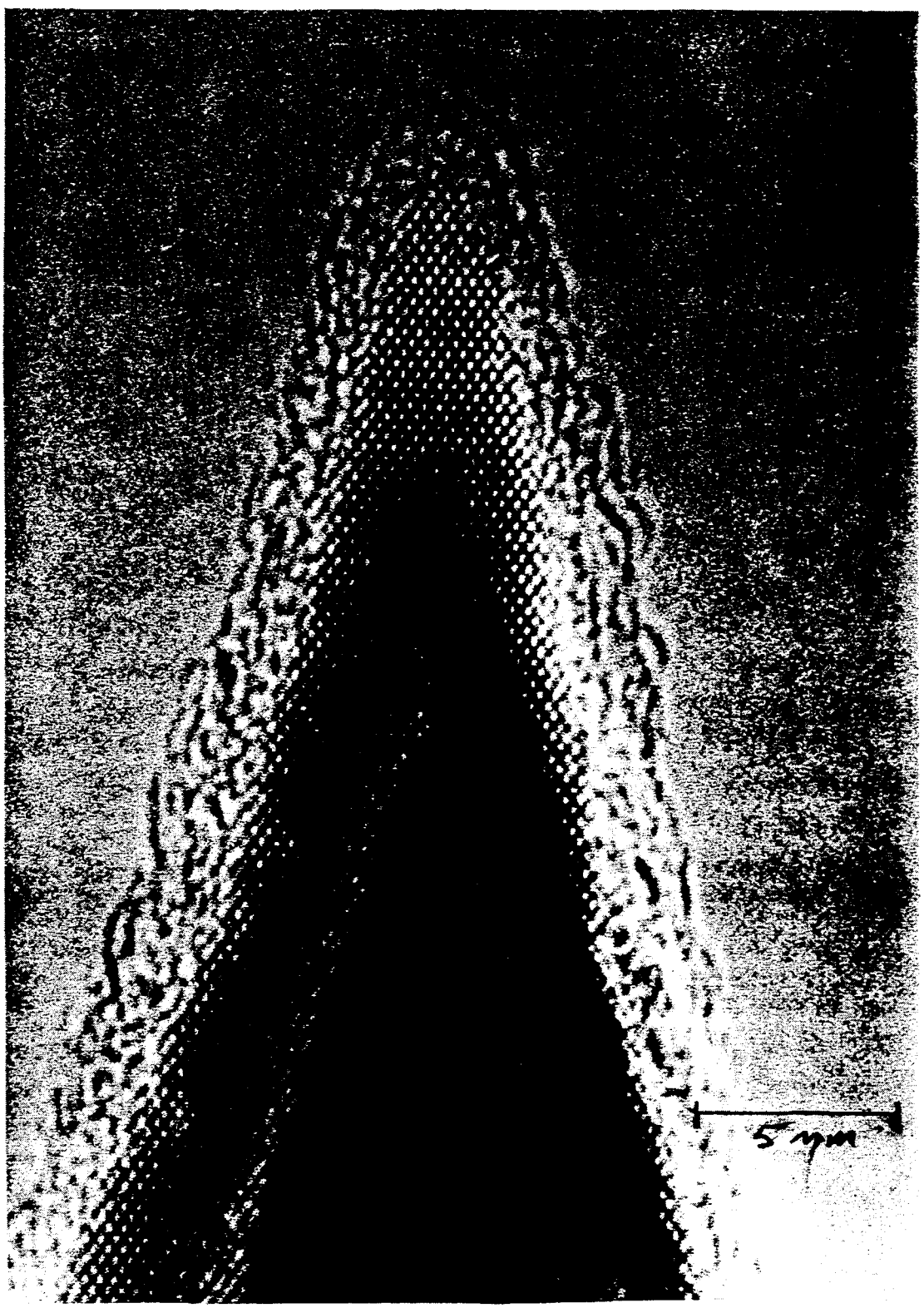
FIG. 1 transmission electron micrograph of the of tip a silicon protuberance in accordance with a preferred embodiment of the invention.

FIG. 1 shows the tip of a preferred silicon needle, magnified as reflected in the 5-nanometer scale segment; electrons at 400 keV were used for imaging. The tip has an apex with radius of curvature of approximately 0.5 nanometer. (The structure is covered with an amorphous layer, 1.5 to 2.0 nanometers thick, understood to be due to polymerization of hydrocarbon by the electron beam.)

Figure 2:
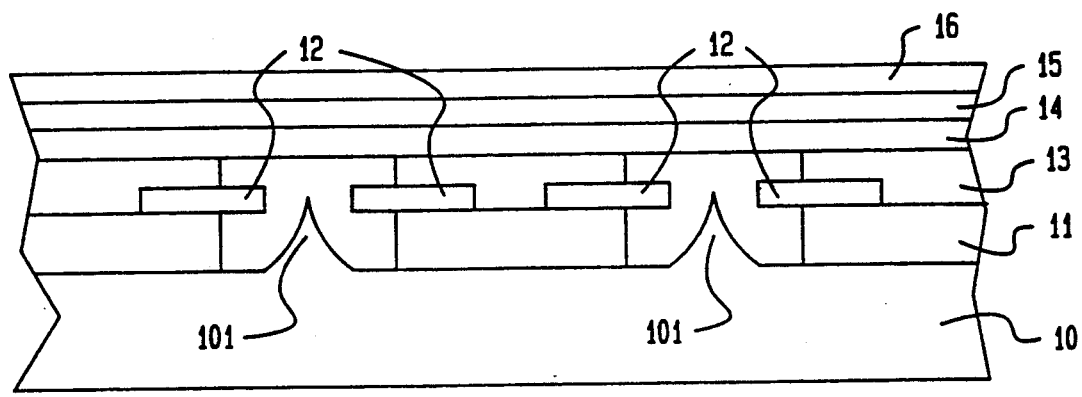
FIG. 2 is a schematic, enlarged cross section of a representative portion of a field-emission display device in accordance with a preferred device embodiment of the invention.

FIG. 2 shows the general design of an illustrative device comprising an array of three-terminal components, as may function as a display device. Specifically shown are single-crystal doped-silicon substrate 10 comprising electron field-emission cathode structures 101 with preferred sharpened tips, first dielectric layer 11, metallic gate electrodes 12, second dielectric layer 13, phosphor layer 14, transparent conductive anode layer 15, and glass plate 16.

Dielectric layers 11 and 13 may consist of silicon dioxide, polyimide, or a combination of silicon dioxide and polyimide, 1.5 micrometer thick, for example. Gate electrodes 12 may consist of titanium, titanium-nickel, titanium-gold, or polycrystalline silicon, 0.5 micrometer thick; anode layer 15 may be made of indium-tin oxide Choice of phosphor material depends on desired color; for example, zinc silicate, doped with manganese produces green light when exposed to electrons emitted from the tips of structures 101. Alternatively, a red display is obtained by inclusion of europium-doped yttrium-phosphorus-vanadium oxide. These and other choices, and basic device fabrication methods are well-known in the art; see, e.g., the patents to I. Brodie and to D. O. Smith et al. and the papers by C. A. Spindt et al. and by C. E. Holland et al. cited above; see also D. J. Elliott, "Integrated Circuit Fabrication Technology", Second Edition, McGraw-Hill Publishing Company, 1989.

Structures 101 may be arranged in one- or two-dimensional arrays; in display devices intended for direct viewing, cathodes typically may have a height of 1 to 10 micrometers and may be spaced from 2 to 20 micrometers apart. Typical spacing between the tips of cathodes 101 and phosphor layer 14 may be from 5 to 100 micrometers. For a preferred method of producing cathodes 101 having preferred sharpness, see the description below with reference to FIG. 6-11.

Localized phosphorescence may be produced in layer 14 upon application of a suitable voltage between substrate 10 and a gate electrode 12, while another, constant voltage is applied between substrate 10 and anode layer 15. Alternatively, anode layer 15 may be patterned into a plurality of segments, and control voltages may be applied between substrate 10 and such segments, while gate electrodes 12 (or a corresponding contiguous electrode) are held at a constant voltage. Contemplated also are two-terminal devices, as well as devices in which luminosity is due, not to a phosphor stimulated by electrons field-emitted in a vacuum, but to a luminescent microplasma near electrode structures 101 which may be anodic or cathodic. Yet another design involves luminosity stimulated in a phosphor layer 14 by ultraviolet light emitted by a plasma near electrodes 101. (Exemplary green and red phosphors mentioned above are sensitive not only to electrons but also to ultraviolet light; suitable as a gas for an ultraviolet-emitting plasma is xenon-doped helium, including 0.1 volume-percent xenon, for example.)

Figure 3:
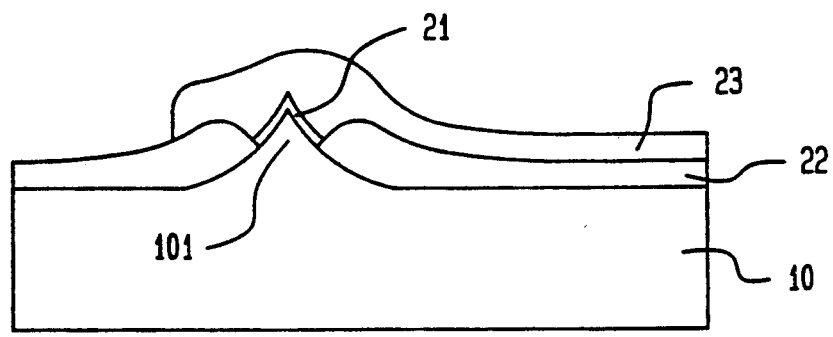
FIG. 3 is a schematic, enlarged cross section of a metal-oxide-semiconductor or tunnel-diode structure in accordance with a preferred further device embodiment of the invention.
Figure 4:
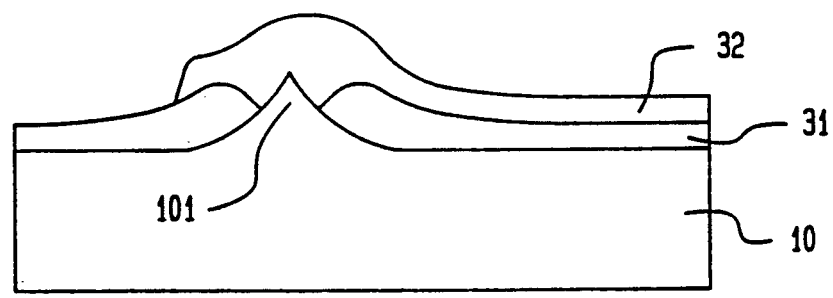
FIG. 4 is a schematic, enlarged cross section of a Schottky-barrier structure in a accordance with a preferred further device embodiment of the invention.
Figure 5:
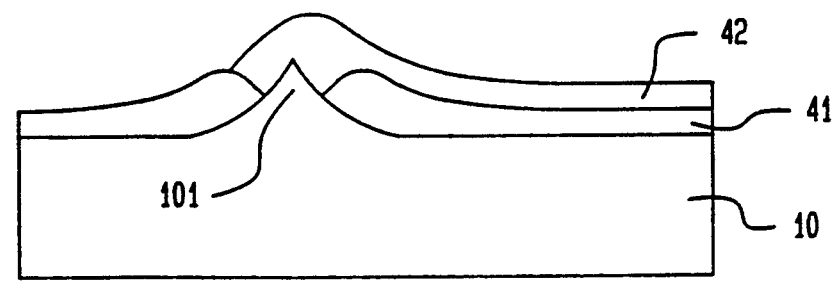
FIG. 5 is a schematic, enlarged cross section of a p-n-junction structure in accordance with a preferred further device embodiment of the invention.

While preferred devices in accordance with FIG. 2 involve structures with high-curvature tips for locally producing high electric fields in a vacuum or in a gas, production of such fields is of interest also in solid-state structures, e.g., to produce highly localized semiconductor devices as illustrated by FIG. 3-5.

FIG. 3 shows silicon substrate 10 with protuberance 101, silicon oxide layer 21 covering the tip of protuberance 101, dielectric layer 22 on the remainder of protuberance 101 and on substrate 10, and metal electrode layer 23 on oxide 260 layer 21 and dielectric layer 22, forming a metal-oxide-semiconductor structure or a tunnel-diode structure depending on layer-21 thickness, chosen in a general range from 1.5 to 100 nanometers. Layer 21 may be formed by thermal oxidation, layer 22 by wet oxidation or deposition, and layer 23 by evaporation (of titanium-gold or nickel-gold, for example.) For further details with respect to basic device fabrication methods see the references mentioned above with respect to FIG. 2; for a preferred method of producing protuberances 101 having preferred sharpness, see the description below with reference to FIG. 6-11.

FIG. 4 shows silicon substrate 10 with protuberance 101, dielectric layer 31 disposed on substrate 10 but leaving the tip of protuberance 101 uncovered, and metal electrode layer 32 in part on dielectric layer 31 and in part on the tip of protuberance 101, forming a Schottky-barrier structure. Layers 31 and 32 may be formed as discussed above with respect to layers 22 and 23, for example. For further details with respect to basic device fabrication methods see the references mentioned above with respect to FIG. 2; for a preferred method of producing protuberances 101 having preferred sharpness, see the description below with reference to FIG. 6-11.

FIG. 5 shows substrate 10 with doped protuberance 101 (n-type, for example), dielectric layer 41 on substrate 10, which leaves the tip of protuberance 101 uncovered, and complementary (p-type) silicon material 42 covering the tip of protuberance 101 and the dielectric 41, forming a p-n- or n-p-junction structure. Layer 41 may be formed as discussed above with respect to layer 22, and layer 42 may be formed by vapor-phase epitaxial deposition, resulting in epitaxial silicon on the tip of protuberance 101 and in polysilicon on layer 41. For further details with respect to basic device fabrication methods see the references mentioned above with respect to FIG. 2; for a preferred method of producing protuberances 101 having preferred sharpness, see the description below with reference to FIG. 6-11.

Figure 6:
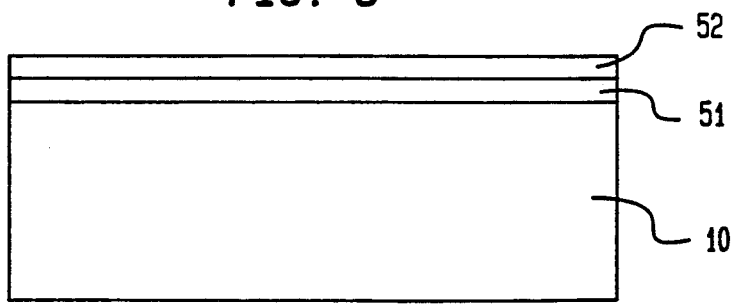
FIG. 6-10 are schematic, enlarged elevations of a structure, progressively at initial, intermediate, and final stages of preferred processing of the invention.

FIG. 6 shows an initial structure comprising single-crystal silicon substrate 10, a deposited mask layer 51 (consisting, e.g., of silicon oxide or nitride), and a deposited resist layer 52, consisting of a radiation-sensitive material—sensitive, e.g., to light, x-rays, electrons, or ions. Such structure may be produced by methods well known in the art of semiconductor device processing; in this respect, as well as with respect to further standard processing details in connection with FIG. 7-9, see, e.g., the book by D. J. Elliott cited above.

Figure 7:
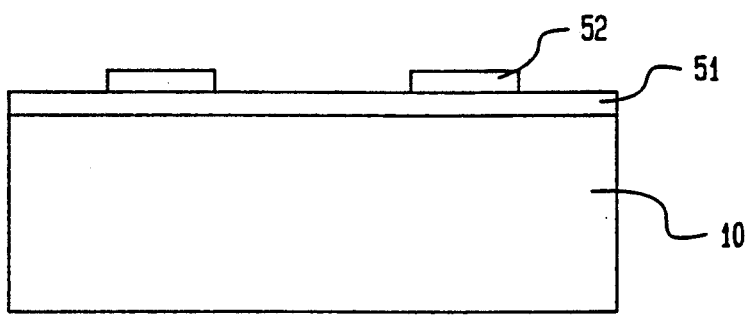

FIG. 7 shows the structure of FIG. 6 after further processing by patterning of resist layer 52 by exposure and development. In the fabrication of cone- or pyramid-shaped tapered structures a resulting mask pattern may comprise one or several circular or square-shaped regions or "islands" having a diameter or width of 1-30 micrometers. Other patterns may be used: for example, when making linear or curvilinear wedge-shaped tapered structures, use of a corresponding strip pattern is indicated. Alternatively, for circular or other closed-curve patterns, a larger island may be used such that the desired pattern is delineated by the edge of the island; see the paper by R. B. Marcus et al. cited above.

Figure 8:
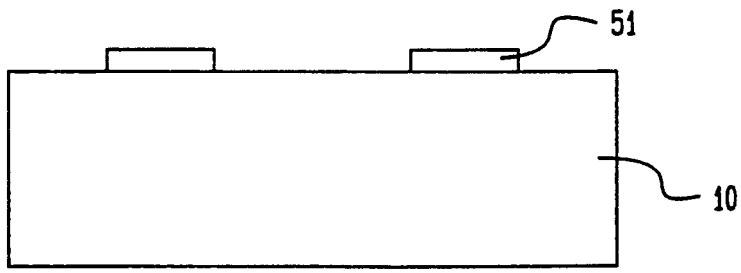

FIG. 8 shows the structure of FIG. 7 after further processing by transfer of the resist pattern to mask layer 51 by etching, followed by stripping of resist remnants (In the case of silicon dioxide as a mask-layer material, plasma etching by means of a mixture of carbon tetrafluoride and hydrogen can be used for etching; in the case of silicon nitride, a mixture of carbon tetrafluoride and oxygen can be used.)

Figure 9:
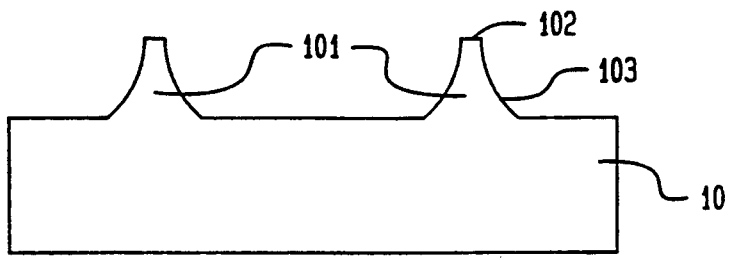

FIG. 9 shows the structure of FIG. 8 after suitable silicon processing to form protuberances 101 below the mask islands, e.g., by isotropic etching (by means of a mixture of nitric and hydrofluoric acids, for example), by reactive ion etching, or by ion milling. Preferably, in order to prevent the formation of protuberances having blunt, rounded tips, etching is terminated before mask islands become detached. Resulting protuberances comprise a small, essentially flat top portion 102, and a straight or concave sidewall 103. Preferably, in the interest of expeditious preferred processing as described below with reference to FIG. 10, the width of portion 102 does not exceed 500 nanometers. After etching, mask-layer remnants may be stripped; alternatively, stripping may be omitted as mask remnants are removed upon subsequent oxidation processing.

Figure 10:
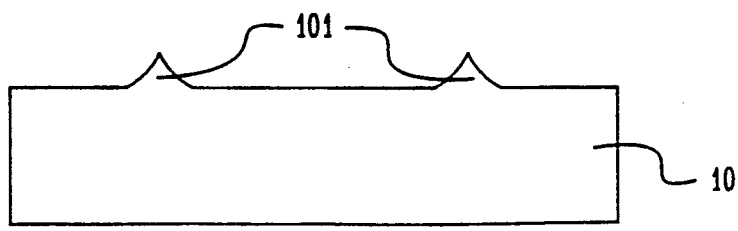

FIG. 10 shows the structure of FIG. 9 after oxidation processing. A preferred oxidation procedure in accordance with an aspect of the invention involves exposure of the structure of FIG. 9 to a dry-oxygen environment, preferably at a temperature not exceeding 1050 degrees C., and preferably with oxygen contributing at least 50 percent, and water vapor at most 1 percent of total pressure. Contemplated as diluents or carrier gases are, e.g., helium, argon, or nitrogen. In the interest of adequate reaction rate for processing times of 2 to 6 hours at ambient pressure, preferred processing temperature is at least 900 degrees C. The use of higher or lower pressures is not precluded; preferred processing times are inversely related to pressure and temperature.

From the resulting oxidized structure, surface oxide is stripped, e.g., in concentrated hydrofluoric acid or a buffered hydrofluoric solution. For enhanced sharpness, preferred oxidation processing and stripping may be repeated one or several times, the preferred number of repetitions being directly related to the width of the flat portion 102.

Optionally, in case protuberances in an initial array illustrated in FIG. 9 are of highly nonuniform shape, processing as described above may be preceded by exposure to a humid environment at a preferred temperature above 1050 degrees C. for times longer than 3 minutes, resulting in more uniform morphology.

Figure 11:
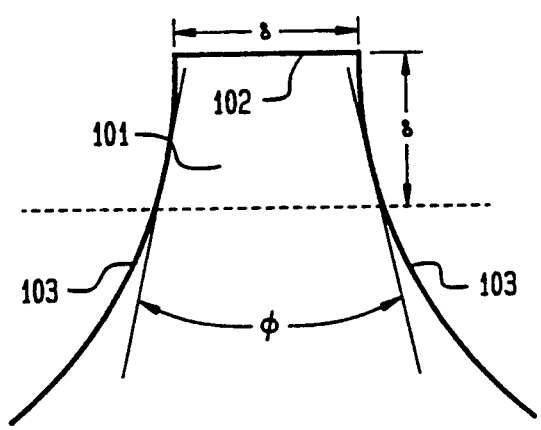
FIG. 11 is a schematic, enlarged elevation of a portion of the structure shown in FIG. 9, further showing preferred initial taper.

In addition to structural features 101, 102, and 103 in accordance with FIG. 9, FIG. 11 shows the width of flat portion 102 as delta, and a taper angle phi as determined by tangents to facing, concave sidewalls 103. Tangents are placed at points spaced a distance from surface 102, such distance being equal to delta, the same as the width of flat portion 102. In the absence of a protective cover on surface 102, efficacy of preferred sharpening as described above depends on sufficient slenderness of protuberance 101, characterized by a sufficiently small angle phi; specifically preferred are angles phi not exceeding approximately 30 degrees. Alternatively, and especially when an initial protuberance is formed by anisotropic etching, such condition may not be met, in which case oxidation sharpening may still be applied so long as surface 102 remains covered—by mask 51, for example.

Repeated preferred oxidation treatments enhance sharpness and also uniformity of apices in an array of protuberances. This is desirable indeed as, in most instances, enhanced uniformity may be sought in combination with enhanced sharpness. However, in accordance with a further aspect of the invention, once a sharpened, highly uniform array has been produced it is possible, without loss of uniformity, to decrease apex sharpness by a further, high-temperature oxidation treatment. Suitable for this purpose are wet or dry oxidizing environments, preferably at a temperature which exceeds 1050 degrees C. For example, when protuberances with one-nanometer radius of curvature are exposed to water vapor at a temperature of 1100 degrees C. for 3 minutes, radius of curvature will increase uniformly to approximately 2.5 nanometers.

Depending on intended use of a sharpened silicon structure, the final surface may be passivated, e.g., by rinsing with concentrated hydrofluoric acid, thereby producing an essentially oxide-free silicon surface (see E. Yablonovitch et al., "Unusually Low Surface-Recombination Velocity on Silicon and Germanium Surfaces", Physical Review Letters, Vol. 57 (1986), pp. 249-252.) Such passivation is of interest, e.g., when a sharpened tip is subsequently covered with a metal, e.g., gold. Alternatively, passivation may be omitted, e.g., when a surface oxide layer is desired (see FIG. 3, for example.) Of particular interest is processing, subsequent to stripping of surface oxide, by chemical replacement of surface silicon by another material, e.g., tungsten; for processing details see the above-identified patent to H. H. Busta et al. In accordance with an aspect of the invention, such replacement can be carried out while essentially maintaining preferred sharpness of a sharpened silicon structure.

The sharpness of resulting tapered structures, e.g., needles, cones, pyramids, wedges, and ridges can be characterized by a radius of curvature at an apex of the tapered structure. In the case of needles, cones, and pyramids such termination is approximately spherical, with a well-defined radius of curvature; in the case of wedges or ridges, straight or curvilinear, curvature may be determined in a plane perpendicular to a wedge or ridge. Thus, in structures of interest, there is at least one cross section in which radius of curvature is defined in this fashion.

Tapered structures of the invention can be used in vacuum-microelectronic devices, e.g., field-emission and plasma display devices, and as electron sources for other applications, e.g., scanning electron microscopes, scanning tunneling microscopes, and cathode ray tubes. Also contemplated is their use in atomic force microscopes, as biological probes, and in solid state devices as exemplified.

What is claimed is;

1. A discharge device comprising at least one tapered silicon protuberance which terminates in an apex whose radius of curvature in a vertical cross-sectional view is less than 10 nanometers, said protuberance having been fabricated by being exposed to an essentially dry oxidizing environment at a temperature not exceeding 1050° C., and by stripping any oxide surface formed from said protuberance.

2. The dischange device of claim 1 wherein said radius of curvature in the vertical cross-sectional view is of the order of 1 nanometer or less.

3. The discharge device of claim 1 comprising a plurality of protuberances and wherein said protuberances are needle-shaped.

4. The discharge device of claim 1 comprising a plurality of protuberances and wherein said protuberances are cone-shaped.

5. The discharge device of claim 1 comprising a plurality of protuberances and wherein said protuberances are pyramid-shaped.

6. The discharge device of claim 1 wherein said protuberance is wedge-shaped.

7. The discharge device of claim 1 further comprising an electrode for producing, upon application of a voltage between said protuberance and said electrode, a locally high electric field in the vicinity of said apex.

8. The discharge device of claim 7, wherein said electrical field results in field emission of electrons from said apex.

9. The discharge device of claim 7, further comprising a silicon oxide layer on said apex and a metal layer on said silicon oxide layer on said apex and a metal layer on said silicon oxide layer, forming a metal-oxide-semiconductor in the vicinity of said apex.

10. The discharge device of claim 7, further comprising a dielectric layer adjacent but not covering said apex and a metal layer on said dielectric layer and said apex, forming a Shottky-barrier configuration in the vicinity of said apex.

11. The discharge device of claim 7 wherein said protuberance is doped for a first conductivity type, and further comprising a dielectric layer adjacent but not covering said apex and an epitaxial silicon layer covering said apex and said dielectric layer, said epitaxial layer being doped for a second conductivity type, which is complementary to said first conductivity type, forming a junction configuration in the vicinity of said apex.

12. The discharge device of claim 7, further comprising a silicon oxide layer on said apex and a metal layer on said silicon oxide layer, forming a tunnel-diode configuration in the vicinity of said apex.

* * * * *